(12) United States Patent
Eilts et al.

(10) Patent No.: US 10,491,745 B2
(45) Date of Patent: Nov. 26, 2019

(54) PROCESS FOR REAL-TIME DATA EXCHANGE BETWEEN USERS ON A PHONE CALL

(71) Applicant: Microsoft Technology Licensing, LLC, Redmond, WA (US)

(72) Inventors: Jason Mathew Eilts, Redmond, WA (US); Alvin Chardon, Framingham, MA (US); Ben Greenier, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/847,381

(22) Filed: Dec. 19, 2017

(65) Prior Publication Data

US 2018/0176367 A1 Jun. 21, 2018

Related U.S. Application Data

(63) Continuation of application No. 14/623,057, filed on Feb. 16, 2015, now Pat. No. 9,866,684.

(51) Int. Cl.
*H04W 4/16* (2009.01)
*H04M 3/42* (2006.01)
(Continued)

(52) U.S. Cl.
CPC ....... *H04M 3/42042* (2013.01); *H04M 1/575* (2013.01); *H04M 1/72519* (2013.01); *H04M 3/42093* (2013.01); *H04M 7/0036* (2013.01); *H04W 4/16* (2013.01); *H04M 1/72566* (2013.01); *H04M 1/72569* (2013.01); *H04M 2203/351* (2013.01); *H04M 2203/352* (2013.01);
(Continued)

(58) Field of Classification Search
CPC ............. H04M 1/575; H04M 3/42042; H04M 3/42093
USPC ....................................................... 455/415
See application file for complete search history.

(56) References Cited

U.S. PATENT DOCUMENTS 6,353,664 B1 3/2002 Cannon et al.
6,873,692 B1 3/2005 Silver et al.
(Continued)

FOREIGN PATENT DOCUMENTS

CN 101651760 A 2/2010
CN 104243728 A 12/2014
CN 104284001 A 1/2015

OTHER PUBLICATIONS

"Apps in Your CallsTM (with real phone numbers!)", Retrieved From <<http://voxeolabs.com/ameche/apps-in-calls/>>, Nov. 1, 2012, 2 Pages.
(Continued)

*Primary Examiner* — Thomas J Lett
(74) *Attorney, Agent, or Firm* — Karin L. Williams; Mayer & Williams PC

(57) ABSTRACT

A process for real-time data exchange allows for sharing data, including metadata such as user data and phone data, between multiple handsets so that handsets may automatically display such data upon initiation or establishment of a telephone call, and in some arrangements throughout the life of the call. In this way, the need for subsequent data transmissions is reduced or eliminated, making bandwidth usage more efficient and conserving battery power.

20 Claims, 14 Drawing Sheets

(51) Int. Cl.
*H04M 1/57* (2006.01)
*H04M 1/725* (2006.01)
*H04M 7/00* (2006.01)

(52) U.S. Cl.
CPC .... *H04M 2250/10* (2013.01); *H04M 2250/12* (2013.01); *Y02B 70/30* (2013.01); *Y02D 70/00* (2018.01); *Y02D 70/142* (2018.01); *Y02D 70/144* (2018.01); *Y02D 70/164* (2018.01); *Y02D 70/26* (2018.01)

(56) References Cited

U.S. PATENT DOCUMENTS

| | | | |
|---|---|---|---|
| 7,873,366 | B2 | 1/2011 | Chen |
| 8,027,705 | B2 | 9/2011 | Kim et al. |
| 8,090,389 | B2 | 1/2012 | Tysowski |
| 8,478,248 | B2 | 7/2013 | Lee et al. |
| 9,866,684 | B2 * | 1/2018 | Eilts ................. H04M 3/42042 |
| 2001/0027098 | A1 | 10/2001 | Suzuki |
| 2001/0031633 | A1 | 10/2001 | Tuomela et al. |
| 2003/0013456 | A1 | 1/2003 | Bates et al. |
| 2003/0016804 | A1 | 1/2003 | Sheha et al. |
| 2003/0105827 | A1 | 6/2003 | Tan et al. |
| 2004/0097224 | A1 | 5/2004 | Lim |
| 2005/0079879 | A1 | 4/2005 | Carlson et al. |
| 2005/0130666 | A1 | 6/2005 | Levy et al. |
| 2005/0156748 | A1 | 7/2005 | Lee et al. |
| 2007/0047726 | A1 | 3/2007 | Jabbour et al. |
| 2008/0045184 | A1 | 2/2008 | Randall et al. |
| 2008/0200158 | A1 * | 8/2008 | Harris ................. H04W 72/005 455/416 |
| 2009/0094531 | A1 | 4/2009 | Danieli et al. |
| 2010/0180001 | A1 | 7/2010 | Hardt |
| 2010/0215161 | A1 | 8/2010 | Baccay |
| 2010/0303219 | A1 | 12/2010 | Michaelis et al. |
| 2011/0117941 | A1 | 5/2011 | Zhang |
| 2011/0129077 | A1 | 6/2011 | Prakash et al. |
| 2011/0182414 | A1 | 7/2011 | Hemant et al. |
| 2011/0306366 | A1 | 12/2011 | Trussel et al. |
| 2012/0063577 | A1 | 3/2012 | Foster |
| 2012/0170572 | A1 | 7/2012 | Bareli et al. |
| 2012/0204113 | A1 | 8/2012 | Shiplacoff et al. |
| 2013/0242262 | A1 | 9/2013 | Lewis |
| 2013/0331070 | A1 | 12/2013 | Aldecoa |
| 2014/0045480 | A1 | 2/2014 | Hsieh et al. |
| 2014/0274003 | A1 | 9/2014 | Belford et al. |
| 2014/0302833 | A1 * | 10/2014 | Jin .......................... H04W 4/16 455/417 |
| 2015/0172419 | A1 | 6/2015 | Toledo et al. |
| 2015/0172441 | A1 | 6/2015 | Samhat |
| 2015/0250393 | A1 | 9/2015 | Tran |
| 2015/0293738 | A1 | 10/2015 | Lee |
| 2016/0037345 | A1 | 2/2016 | Margadoudakis |
| 2016/0212725 | A1 | 7/2016 | Qiu et al. |
| 2017/0041742 | A1 | 2/2017 | Toksvig et al. |

OTHER PUBLICATIONS

Tofel, Kevin C., "Mapfia: Location Sharing Between Two People via Phone Call", Retrieved From <<https://gigaom.com/2012/06/26/mapfia-location-sharing-between-two-people-via-phone-call/>>, Jun. 26, 2012, 4 Pages.
"Final Office Action Issued in U.S. Appl. No. 14/623,057", dated Mar. 7, 2017, 19 Pages.
"Non-Final Office Action Issued in U.S. Appl. No. 14/623,057", dated May 19, 2017, 16 Pages.
"Non-Final Office Action Issued in U.S. Appl. No. 14/623,057", dated Aug. 2, 2016, 14 Pages.
"Notice of Allowance Issued in U.S. Appl. No. 14/623,057", dated Sep. 12, 2017, 5 Pages.
Alba, Davey., "Sidecar App Re-Invents Voice Calls: Share Anything While on the Phone", Retrieved From <<http://blog.laptopmag.com/hands-on-with-sidecar-for-ios-and-android-facetime-on-steroids>>, May 22, 2012, 8 Pages.
"International Search Report and Written Opinion Issued in PCT Application No. PCT/US2016/015870", dated Apr. 25, 2016, 13 Pages.
"Second Written Opinion Issued in PCT Application No. PCT/US2016/015870", dated Aug. 8, 2016, 8 Pages.
"Office Action Issued in European Patent Application No. 16707278.4" dated Aug. 9, 2018, 5 Pages.
"Office Action and search Report Issued in Chinese Patent Application No. 201680010554.7", dated Aug. 27, 2019, 35 Pages.

* cited by examiner

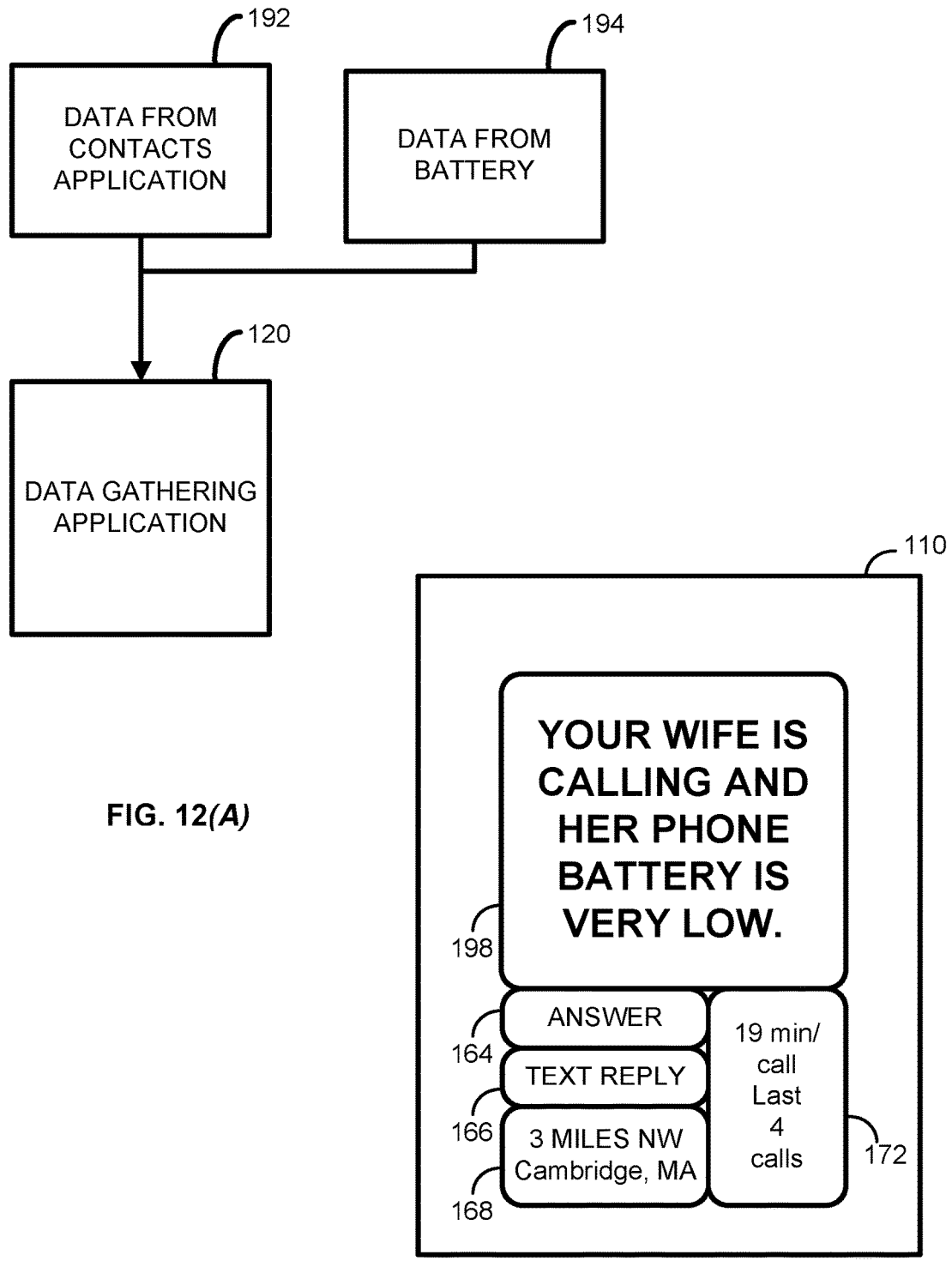

PROCESS FOR REAL-TIME DATA EXCHANGE BETWEEN USERS ON A PHONE CALL

CROSS-REFERENCE TO RELATED APPLICATIONS

This application is a continuation of U.S. patent application Ser. No. 14/623,057 that was filed Feb. 16, 2015, entitled "PROCESS FOR REAL-TIME DATA EXCHANGE BETWEEN USERS ON A PHONE CALL" which is incorporated herein by reference in its entirety.

BACKGROUND

Typically the point of a phone call is for one person to exchange information with another, and such occurs by the verbal (and sometimes video) communications between the individuals on the call. The phone equipment itself may appear to provide information, but such information generally is provided from the service provider, and the same is very limited, e.g., limited to an identifying phone number for a caller and in some cases the caller's name, e.g., via caller identification.

This Background is provided to introduce a brief context for the Summary and Detailed Description that follow. This Background is not intended to be an aid in determining the scope of the claimed subject matter nor be viewed as limiting the claimed subject matter to arrangements that solve any or all of the disadvantages or problems presented above.

SUMMARY

Arrangements described utilize a local data-gathering service on at least one client, e.g., running on a mobile device, which communicates information associated with a first (caller) device, including about the user, to a second (receiver) device when the first device initiates the communication with the second device. In this way, the second device may display to its user data associated with the first device prior to the second device answering the call. Such may provide relevant data to the user of the second device, assisting the user in determining how and whether to answer the call. Data may also flow in the opposite direction, allowing the first device to display data associated with the second device.

Relevant data may include those available from sensors and/or applications running on a mobile device, e.g., accelerometer data, GPS data, calendar data, battery life data, contacts information data, whether the calling user is employing a Bluetooth wireless headset or speakerphone, or the like. This data is variously termed herein as "data" or "metadata", and both are intended to include data that describes or is associated with various aspects of a phone call.

For example, by communication of battery life data from one device to another, a user may infer how long a caller is available to talk, or the same may be automatically displayed by the service. Conversely, a user may determine how long a receiver has available to talk. Multiple sources of data may be employed. For example, by use of GPS data and calendar data, a mobile device of a receiver may display metadata that the caller is at a meeting location (from GPS data) and that a meeting is about to begin (from calendar data). Such data may be portrayed on the receiver's mobile device, galvanizing the receiver to respond because the caller may be calling with an imminent question about the upcoming meeting. A step of analysis may be performed using received data on any of the first or second devices, or cloud components, so as to automatically determine or guess aspects of the call as noted above. The analysis may also calculate an urgency index associated with the call. In the above example, the receiver may infer from the context that the call is urgent, or the analysis may automatically determine or guess such urgency and indicate the same on the user interface on the receiver's device.

Advantages of the invention may include, in certain embodiments, one or more of the following. Significant bandwidth is saved by having data pre-gathered and forwarded to a device upon initiation of a call. In the same way, battery life is significantly lengthened by performing such steps at times when devices are not actively engaged in a call. Periods of time are minimized when mobile devices, which are generally severely resource-constrained devices, are called upon to perform multiple tasks simultaneously. Data may be automatically displayed, conserving significant bandwidth while at the same time providing greater information, data that was previously limited to at most a caller ID. Other advantages will be understood from the description that follows, including the figures and claims.

This Summary is provided to introduce a selection of concepts in a simplified form that are further described below in the Detailed Description. Elements or steps other than those described in this Summary are possible, and no element or step is necessarily required. This Summary is not intended to identify key features or essential features of the claimed subject matter, nor is it intended for use as an aid in determining the scope of the claimed subject matter. Furthermore, the claimed subject matter is not limited to arrangements that solve any or all disadvantages noted in any part of this disclosure. It may be appreciated that the above-described subject matter may be implemented as a computer-controlled apparatus, a computer process, using system, or as an article of manufacture such as one or more computer readable storage media. These and various other features may be apparent from reading of the following Detailed Description and a review of the associated drawings

BRIEF DESCRIPTION OF THE DRAWINGS

FIGS. 12(A) and 12(B) illustrate a data flow and a user interface in a further arrangement of a system and method for determining and sharing locally-collected data.

Figure 1:
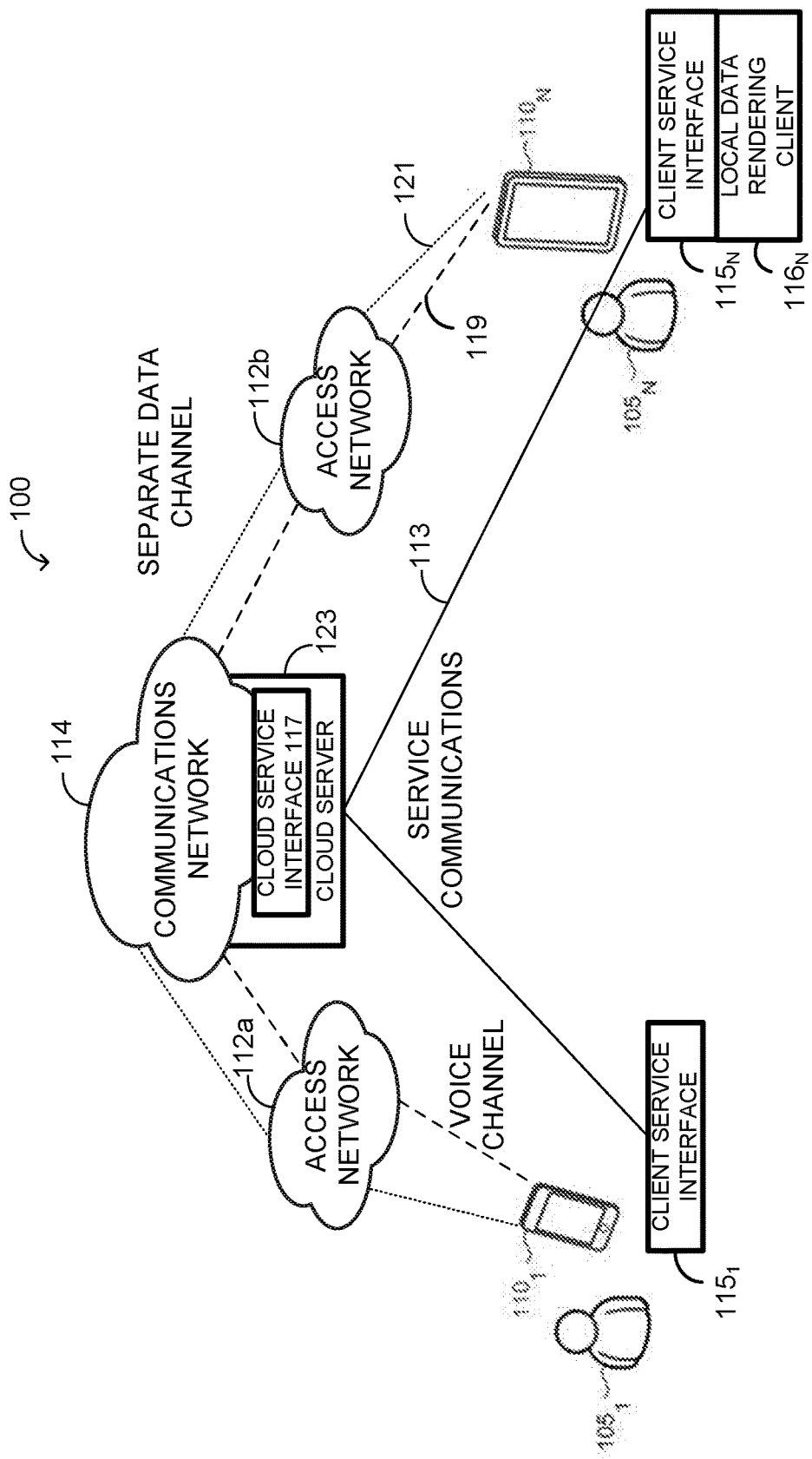
FIG. 1 shows an illustrative environment in which users with devices having communications capabilities interact over one or more networks, including a communications network accessed by respective access networks.

Like reference numerals refer to like elements throughout. Elements are not to scale unless otherwise noted. It is emphasized that the particular user interfaces displayed in the drawings can vary from what is shown according to the needs of a particular arrangement. While user interfaces are shown in portrait mode in the drawings, the present arrangement may also be implemented using a landscape mode.

DETAILED DESCRIPTION

FIG. 1 shows an illustrative communications environment 100 in which various users 105 employ respective devices 110 that can interact over one or more communications networks which can typically include various access networks (representatively indicated by reference numerals 112$a$, 112$b$, and so on) and a communications network 114. The communications network 114 typically uses IP-based transport and signaling and can be supported, for example, by mobile operators, enterprises, Internet service providers (ISPs), telephone service providers, data service providers, and the like.

The communications network 114 typically includes interfaces that support a connection to the Internet so that the devices 110 can access content and communicate with each other through a network interface. The devices 110 and communications network 114 may be configured to enable device-to-device communication using peer-to-peer and/or server-based protocols. Support for device-to-device communications may be provided, at least in part, using various applications that run on devices 110.

The devices 110 may provide various capabilities, such as voice and video calling and messaging, and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting), use applications and access services that employ data, browse the World Wide Web, and the like.

Alternative types of electronic devices are also envisioned to be usable within the communications environment 100 so long as they are configured with communication capabilities and can connect to the IP communications network 114. Such alternative devices variously include handheld computing devices, PDAs (personal digital assistants), portable media players, phablet devices (i.e., combination smartphone/tablet devices), wearable computers, wearable devices in communication with mobile or cellular or other devices described here, navigation devices such as GPS (Global Positioning System) systems, laptop PCs (personal computers), desktop computers, multimedia consoles, gaming systems, networked and/or remotely controlled cameras, or the like. Such cameras may include, for example, room and home surveillance cameras, body-worn cameras, webcams, external cameras used with PCs, tablets, and other computing devices, remote cameras in vehicles, etc. In the discussion that follows, the use of the term "device" is intended to cover all devices that are configured with communication capabilities and have IP access capabilities to the IP communications network 114.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by arrangement. For example, some devices 110 can support touch controls, gesture recognition, natural language interfaces, and voice commands, while others may enable a more limited user interface. Some devices may support video consumption and Internet browsing, while other devices may support more limited media handling and network interface features.

Accessory devices (not shown), such as wristbands and other wearable devices, may also be present in the environment 100. Such accessory devices typically are adapted to interoperate with a device 110 using communication protocols like Bluetooth® and USB (Universal Serial Bus) to support functions such as monitoring of the wearer's physiology (e.g., heart rate, steps taken, calories burned, etc.) and environmental conditions (temperature, humidity, ultra-violet (UV) levels, etc.), and displaying notifications from the coupled device 110.

Many arrangements according to present principles cause data to appear on a second device $110_N$, the data relevant to a communication between a first device $110_1$ and the second device $110_N$. In other words, data about first device $110_1$, including about its user, appears on the second device $110_N$, particularly during initiation of a communication from the first device to the second device, allowing the user of the second device to obtain information about the status of the first device and its user, this information potentially useful to the user of the second device in answering the call from the first device.

FIG. 1 illustrates various ways in which this information can be communicated. In one exemplary way, a service may be implemented for service communications 113 which are supported by either the native operating system of the device or through an application. In one arrangement, the service has a client service interface $115_1$ running on the first device $110_1$ and a client service interface $115_N$ running on the second device $110_N$, as well as a remote or cloud service component 117 operating on a cloud server 123. The client service interface $115_1$ works with a local data-gathering client (described below) to transmit harvested data from one or more data sources available to the local mobile device. The harvesting may be performed in real time during initiation or pendency of a call, including harvesting responsively to one or more relevancy criteria. The remote or cloud service interface or component 117 may be employed to communicate harvested data to a remote service over a network interface and for receiving data from the remote service, the communicating being performed according to the variability of the harvested data, so as to allow a remote device to display aspects of these variable features. Not all communicated data need be displayed in some arrangements; rather, the remote service may apply filtering criteria to determine which harvested data is transmitted to the remote device for display, such that only data that meets one or more criteria passes through the filter for display. The second device may also employ a local data rendering client $116_N$ to determine which data received from the remote service is rendered as selected metadata on the user interface. In determining which data is displayed on the second device, the determination may be performed by the first device $115_1$, the service interface 117, or the local data rendering client $116_N$ or a combination of these. For example, the first device $115_1$ may be configured to only send data that will be transmitted and displayed. Alternatively, the first device may send all data collected, and service interface 117 may be employed to determine what data will be transmitted and displayed. As another alternative, the first device may send all data, the service interface 117 may also send all data it receives from the first device to the second device, and the local data rendering client $116_N$ may select what data is displayed. As noted combinations of these different functionalities may also be employed and will be understood. In implementing the arrangement by a service, the service may employ a REST API to push the data to some cloud storage location, which may be the cloud server 123.

A service may be particularly appropriate for certain arrangements as in many cases only a few bytes of data are required to identify relevant metadata, e.g., context data for the first device, and the same may be stored securely by the server in the cloud using a hash associated with the user whose device and context data is being stored. For example, the location data may be communicated in less than 14 bytes, and calendar data is similar, although additional bytes may be employed for string data identifying a particular appointment or meeting. Subject data, described below, may be conveyed in as many bytes as are required to store the subject string. If the first device is using a Bluetooth wireless headset or speakerphone, such status may be conveyed in less than one byte, in some cases one or two bits. Battery life may be conveyed in about one byte. The service may be conveniently employed to transmit, store, and provide such metadata.

While a common arrangement describe here involves a service transmitting data about a first device to a second device, it will be understood that data flow in the reverse direction may also be employed, i.e., where the second (receiver) device is the source of data provided to the first (caller) device. For example, such may indicate to a caller the battery life of the receiver's device, and thus an expected maximum duration of a phone call. Such may also indicate an upcoming appointment of the receiver, and thus the caller knows to keep the call short.

FIG. 1 also shows alternative ways of communicating metadata between devices. For example, a voice channel 119 may be employed to communicate relevant identified metadata. That is, while the voice channel 119 is employed for voice communications, the same may be modulated to embed metadata information within, or metadata communications may be by user of a frequency that is inaccessible to human hearing. Alternatively, a separate data channel 121 may be employed for such communications. Additionally in some cases, a given device may be able to establish connectivity with more than one access network. For example, a smartphone may have capabilities to use either Wi-Fi or cellular data in some situations, and thus Wi-Fi communications may be employed to communicate metadata according to the methods described, at least to the communications network 114.

Figure 2:
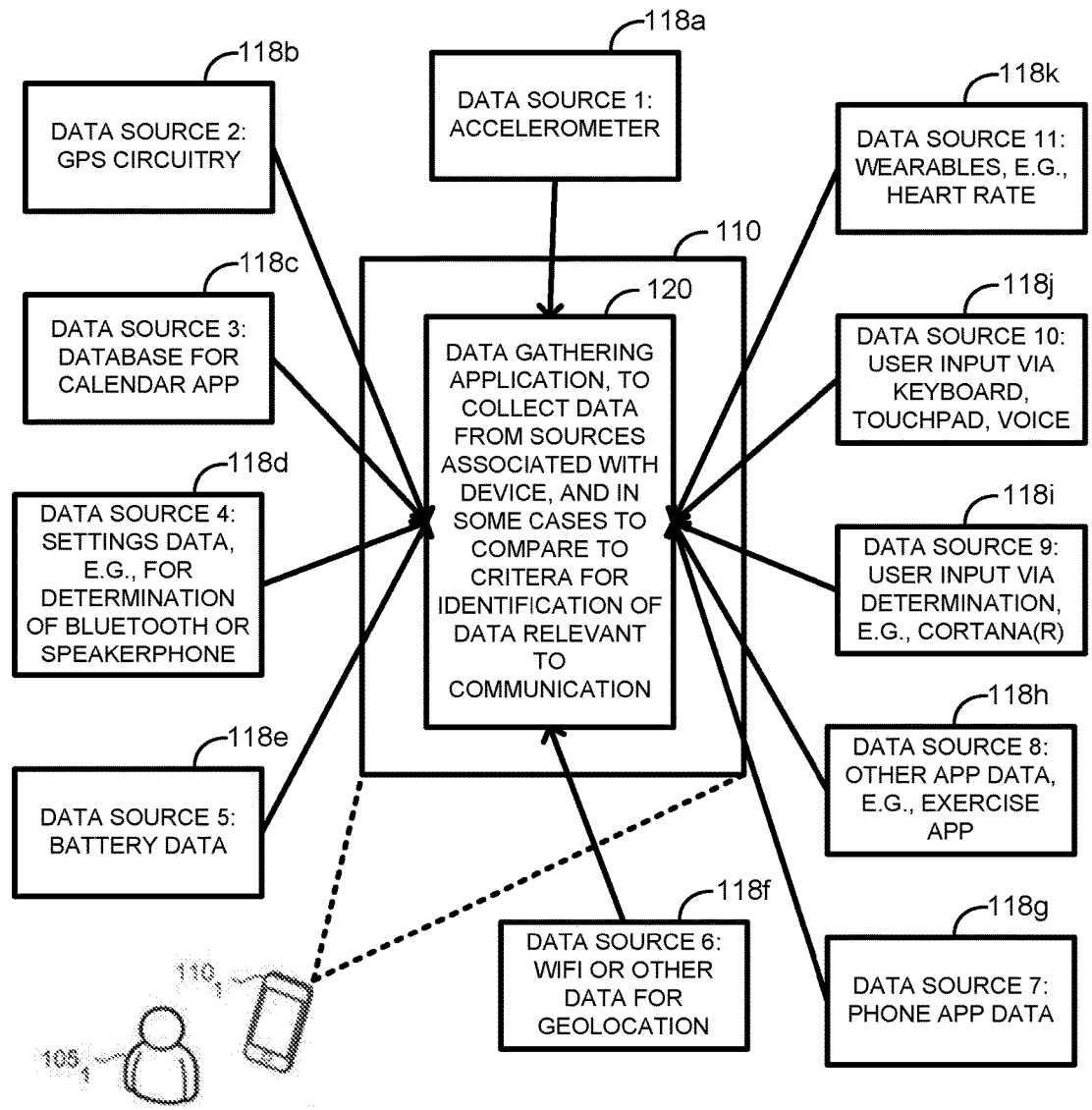
FIG. 2 schematically illustrates various data sources employable in a method for determining and sharing locally-collected data.

FIG. 2 illustrates in a modular fashion a device 110 running a data-gathering application 120. The data-gathering application 120 collects data from various sources associated with the user's phone, e.g., from a caller's phone or a "first device". The data-gathering application 120 may collect and store such data, collectively termed metadata, and may further transmit or cause the transmission of the metadata to a receiver's device, e.g., a "second device". The way in which the data-gathering application 120 provides the metadata to the second device may vary, and may include use of a service, use of channels associated with a mobile carrier or operator, and so on.

Generally the data-gathering application 120 harvests or collects data from numerous sources, as will be described, and a step is performed of analyzing the collected data to determine data relevant to the communication, this data displayed on the receiver's mobile device prior to or during the pendency of the communication. The analyzing the collected data may include comparing the collected data to one or more criteria, which may be predetermined or which may be dependent on other data, and if the collected data meet the requirements of the criteria, the same may be chosen to be transmitted to a remote device from a local device for display. Alternatively, if all collected data is transmitted to the service, or more than that which is chosen for display, and a subset is selected for transmission and display, then the collected data that meet the criteria may be that which is selected.

Generally the date is displayed prior to the communication, and can inform the receiver of how and whether to take the call. The analysis step may be performed by the service, by an application hosted on a cloud server, by the data-gathering application 120 on the caller or receiver mobile device, or on a combination of these. Where a mobile operator performs a step within the arrangement, such as by having local data collected from data-gathering applications hosted on a mobile operator server, then such a server may also host an analysis application. Other variations will also be understood.

Exemplary data sources are now described. A first data source may be an accelerometer 118*a*. Most mobile devices include such as part of standard circuitry, and the same may be employed to determine if the user of the device is moving, stationary, how long the user has been stationary, whether the user has been exercising, and so on. The accelerometer 118*a* may thus provide useful data which may be in the ways described transmitted for display on the receiver mobile device.

A second data source may be GPS circuitry 118*b*. Such GPS circuitry is also generally standard on most modern smart phones, and the same can provide location data where the user has opted for enablement of the GPS functionality. Location data may be employed as metadata to allow a receiver mobile device to display whether a caller mobile device is in proximity to the receiver, at particular locations such as hospitals, home, or work, or to provide other location-based functionality as will be understood. Of course, a caller generally must enable such location-determination functionality, for privacy reasons.

A third data source may be a database or other data collection tool 118c for a calendar or tasks application. This data source may be employed and may be used to inform the receiver device of upcoming meetings or appointments. For example, as noted above, if calendar data indicate that a caller has an upcoming imminent meeting, a communication from such a caller may be the cause of an indication on the receiver mobile device that the caller may be calling about an upcoming imminent meeting. In the same way, if a task is associated with a location or a time for performance, and if a call occurs when the caller is at the location or during the time for performance, a communication from such a caller may be the cause of an indication on the receiver mobile device that the caller may be calling about the task.

A fourth source of data may include certain settings data 118d, such as whether the caller is using Bluetooth or speakerphone, as opposed to a typical internal handset speaker. In this way, the receiver may be informed as to whether others may be privy to the communication, or alternatively whether communications may be considered private.

A fifth source of data may be battery life data 118e. In this way, the receiver may be informed as to whether the caller has just a short time to talk. This type of data, as well as other types of data, may also be transmitted in the opposite direction to the caller's mobile device about the receiver's mobile device and data thereon. For example, a caller may use such data to determine if a receiver has time to talk before their battery dies. The battery life data 118e may also be advantageously employed in urgency determinations. For example, the same may be used in combination with contact information data to determine urgency of a call.

Besides GPS data, a sixth data source may include other data for geolocation 118f, including data about nearby Wi-Fi access points, if such can be detected and/or if a mobile device is close enough to one or more known Wi-Fi access points to determine location. In this context it is also noted that Wi-Fi may also be employed for communication of the meta-data, as well as just for geolocation.

A seventh source of data may include phone application data 118g, i.e., data from browsers or other applications. For example, if the caller has been browsing a restaurant review immediately before the call, the data displayed on the second device may include an indication of such. Privacy concerns may require a level of "opting in" to such disclosure of data, for this and for any other type of data transmitted for display on a second or receiver mobile device.

An eighth source of data may include data 118h from an exercise application. In this way, the receiver may have data displayed about whether the caller has been or is currently exercising. In some cases, similar data may be received from the first data source, i.e., an accelerometer 118a.

A ninth data source may include user input 118i, including using voice-driven user interfaces. For example, a calling user may employ Microsoft's Cortana® intelligent personal assistant to enter subject data, as well as to initiate the call. For example, the user may say "Cortana please call David about dinner tonight" and the data-gathering application may not only retrieve and transmit the subject of "Dinner Tonight" but may also initiate the call to David. Similarly, a tenth data source 118j may be employed to enter subject information via keyboard, touchpad, voice recognition, or other user interface inputs.

Finally, an eleventh data source 118k may correspond to wearable devices that are in data communication with a caller or receiver's mobile device, e.g., heart rate monitors, temperature monitors, blood pressure monitors, and so on. Such may be employed to communicate data to receiver mobile devices, e.g., in medical or counseling applications.

While a number of data sources have been described above, it will be understood given this teaching that other data sources may also be employed. Moreover, while transmission of various data types has been described, the arrangements may further include transmitting data including files from one device to another, including files enclosing meeting invitations, tasks, and the like.

Figure 3:
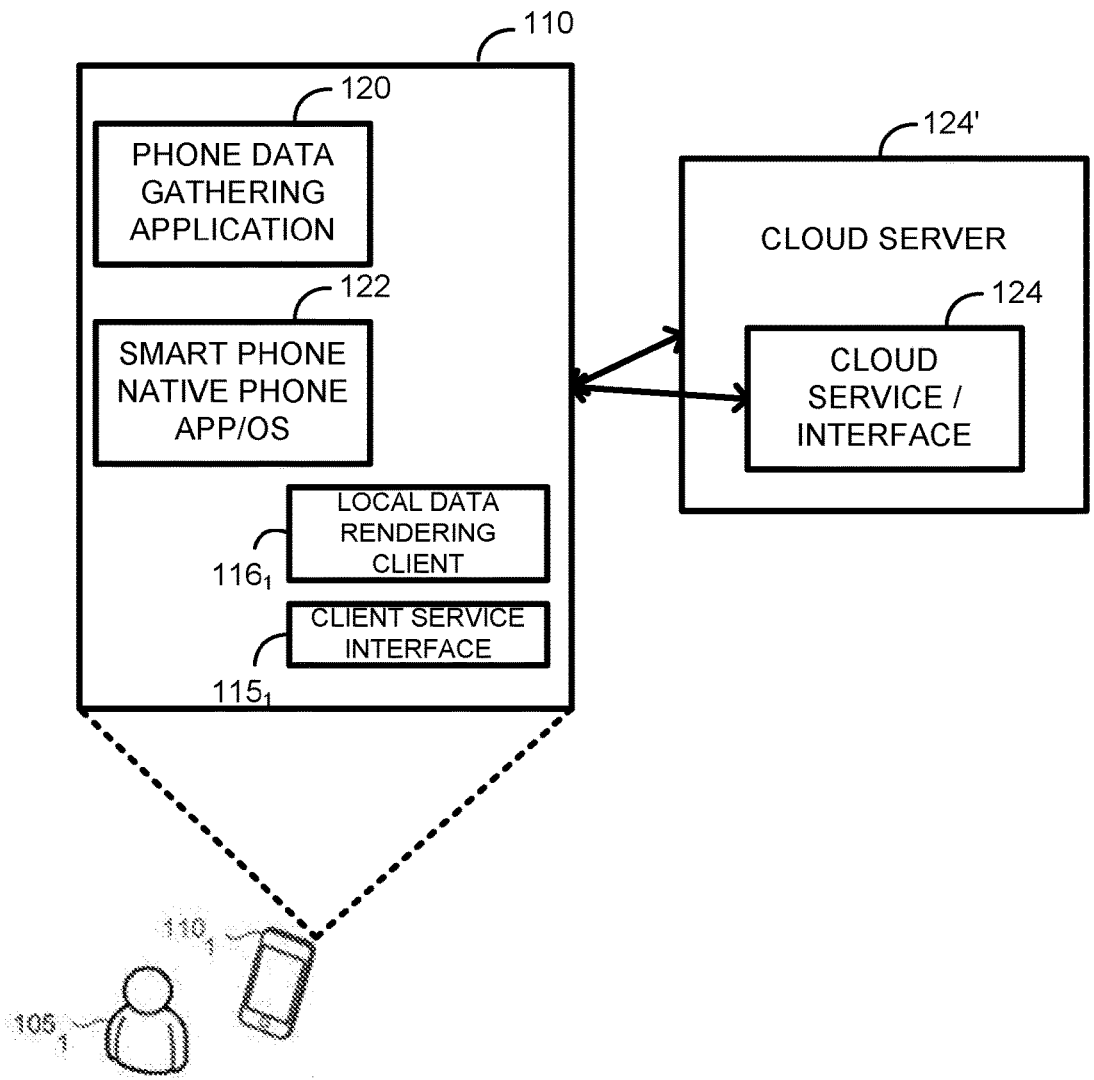
FIG. 3 illustrates various modular components employable in a system and method for determining and sharing locally-collected data.

Referring next to FIG. 3, a modular depiction of an exemplary first or second device 110 is displayed, which may be embodied by a mobile handset, tablet, or other device as described above. In relevant part, the device 110 generally includes a phone data-gathering application 120 and a smart phone native application or operating system component 122. The phone data-gathering application 120 is generally responsible for gathering data from sources described elsewhere and storing the same, either within the application or within an accessible memory, such as in a local data store. The native phone application or operating system component 122 may be employed in some cases as an interface between the data-gathering application and data sources, and may further be employed to display identified metadata, relevant to the communication, on a user interface of the device 110.

In one arrangement a client service interface 115 interacts with a cloud service component 124, such as may be situated on a cloud server 124'. The client service component 115 sends the requisite bytes of data harvested by the data-gathering application 120 using the client service component 115 to the service 124. In another arrangement, the data-gathering application 120 may send data to a cloud server for subsequent transmission to another device using a cloud server without using a service. In this latter case, data may be transmitted using any number of transmission schemes and protocols, including, e.g., text messaging and the like. A local data rendering client 116 is also shown in FIG. 3, and the same is as described above in connection with FIG. 1.

Other components relevant to the operation of the device 110 are described below in connection with FIGS. 13 and 14.

Figure 4:
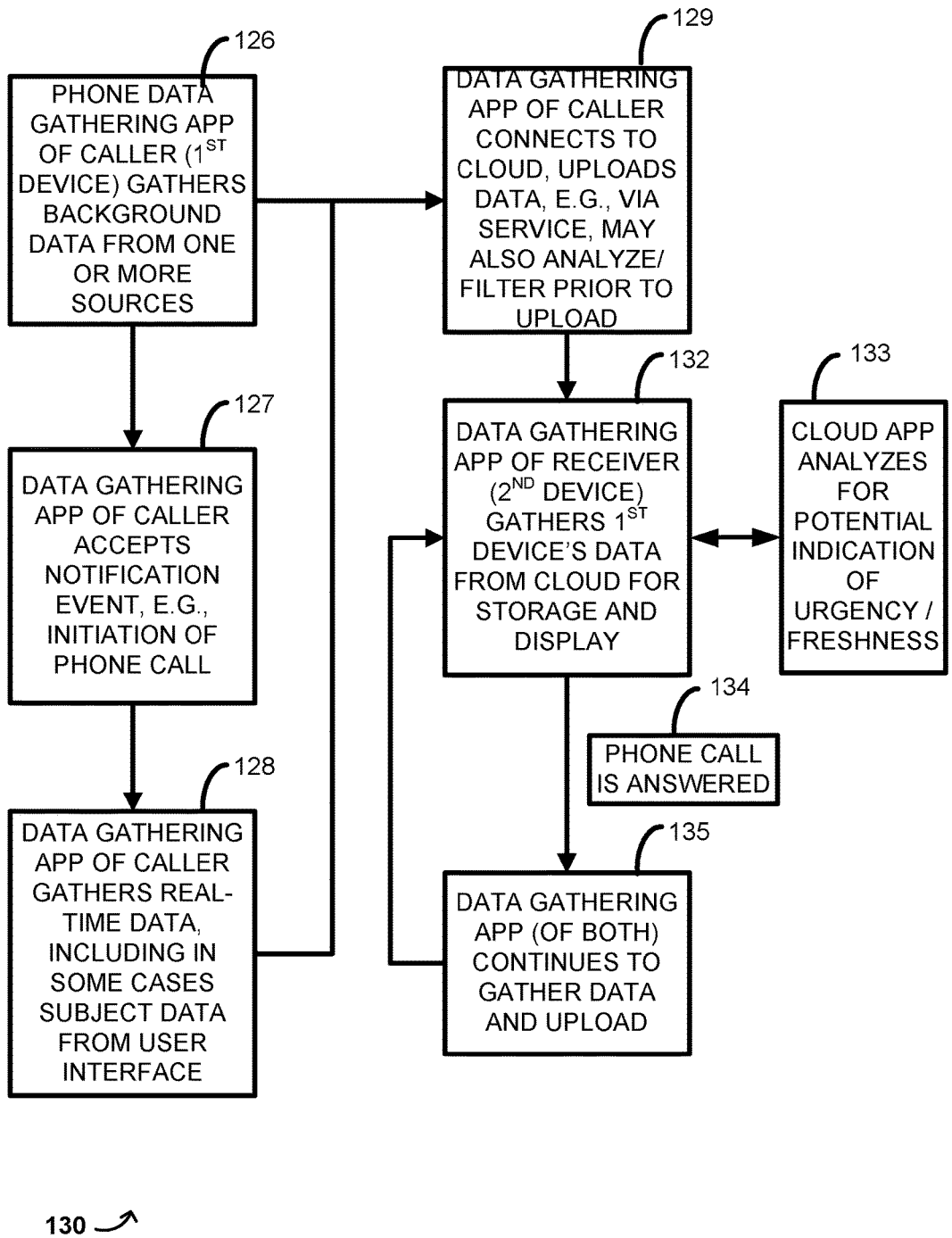
FIG. 4 is a flowchart of a method employable by a phone data-gathering application in a system and method for determining and sharing locally-collected data.

FIG. 4 illustrates a flowchart 130 of a method which may be performed by a data-gathering application, such as may run within the mobile device 110, and in particular within a first device or "calling" device. The data-gathering application generally constitutes a primary component in the data-gathering process. The data-gathering application is generally a long-running background task which can passively gather data (step 126) from data sources within (or in communication with) the mobile device such as, but not limited to, GPS coordinates, compass directions, battery life, calendar data, data from wearable devices, and the like.

The data-gathering application may be configured to accept a notification event when a phone call has been initiated (step 127). Upon acceptance of the notification event, the data-gathering application can gather "on the spot" or "real-time" data, including speakerphone status, current battery life, next calendar appointment, and so on (step 128).

The data-gathering application may then connect to a cloud service in order to upload data to a secured and central location (step 129). In some arrangements, the data-gathering application may have previously connected to the cloud service to upload data to the secured and central location, even without the initiation of a phone call.

As part of its reception of the initiated phone call, a corresponding data-gathering application on the second device, e.g., a receiver device, may gather data from the cloud service for storage and/or display (step 132). That is, data may be gathered about the other connected users information, the data gathered from the cloud service, the data stored in a local device store for subsequent consumption and display.

Having provided the second device identified metadata relevant to the communication, the phone call is answered in a subsequent step (step 134), and the data-gathering application (of both the first and second device) may continue to gather data and uploads the same to the service (step 135).

In some cases a cloud application or application running on a service may be employed to analyze received data from respective data-gathering applications in order to determine if a call made by a calling device should be marked as urgent (step 133). Equivalently, analysis may be performed to determine what data, of the collected data, should be displayed on the receiver device. In the same way either the same or a different cloud application may be employed to determine the "freshness" of data. In particular, while some data may not change rapidly over time, other data may, such as whether the user is on speakerphone or not. For such data, and to conserve battery life, it may be desired to reduce data transmissions corresponding to less-frequently-varying data. In other words, the bytes of data transmitted through the service may vary depending on the type of data, and the service (or cloud application) may determine the freshness of the data, only identifying the same as relevant to the communication if the freshness meets or exceeds a predetermined threshold for that type of data (the criteria for freshness may vary for different types of data, e.g., battery life data will generally vary less rapidly than data about speakerphone status). Alternatively, even less-fresh data may be provided for display, with an appropriate indication of a confidence interval. For example, the same may be displayed as a range.

Analysis of such data may also include use of default data types, such that default data types are provided if no other analysis is available, e.g, as a default data types of battery life and next upcoming meeting may be transmitted for display to a receiver device. Users may be enabled in some arrangements to set such default data types.

Figure 5:
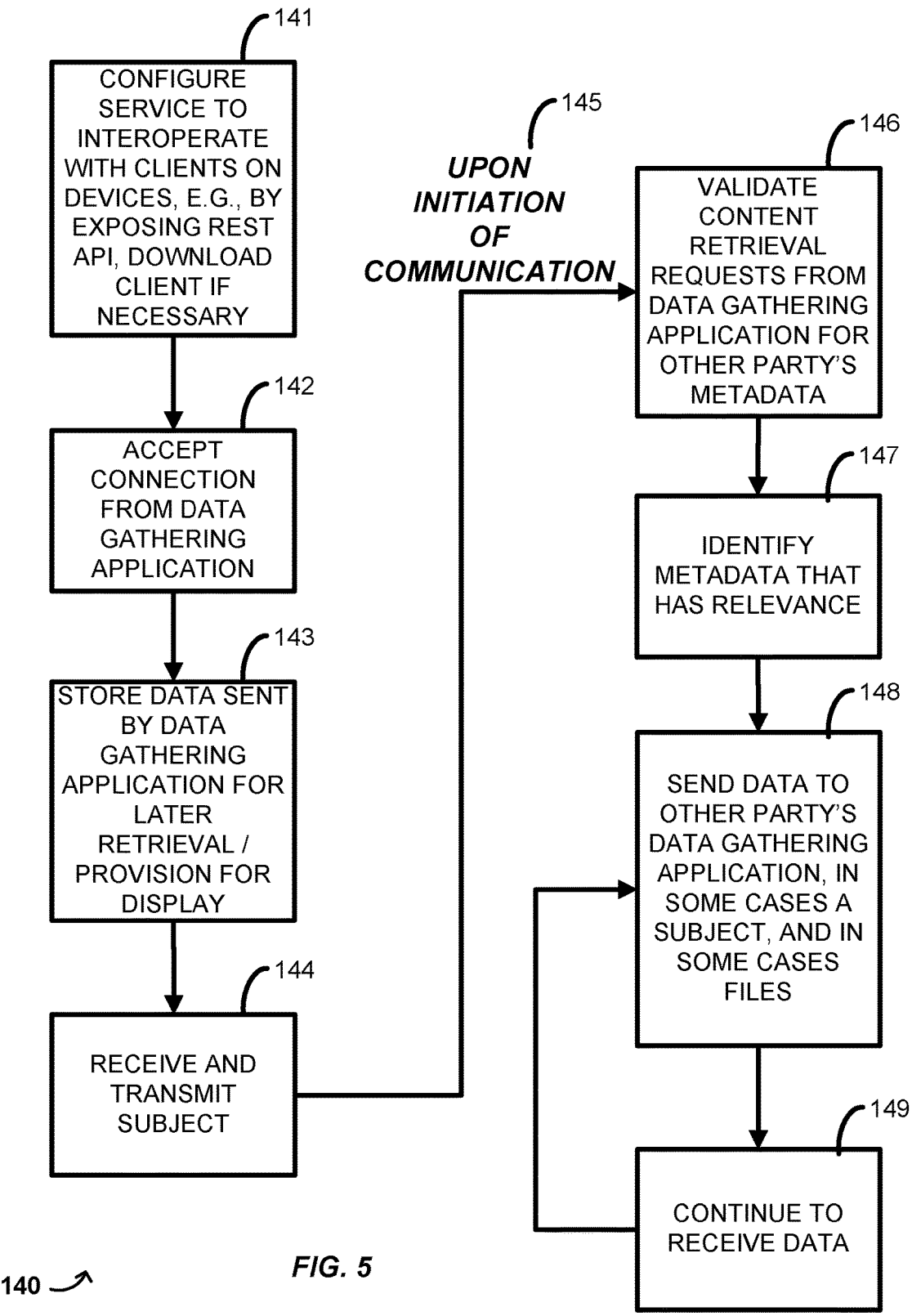
FIG. 5 is a flowchart of a method employable by a cloud service in a system and method for determining and sharing locally-collected data.

FIG. 5 is a flowchart 140 corresponding to steps performed by a service within an exemplary arrangement. The service is generally a component which facilitates the central and secure sharing of data between two connected users. It will be understood that similar steps may be performed by a server application in signal communication with a calling and receiving device.

Steps performed by the service include initial steps of configuring the service to interoperate with local clients on devices (step 141), e.g. including downloading client service components or other applications on the devices if necessary. In one arrangement, the service may be configured by exposing a REST API to client devices.

The service may then accept one or more connections from respective data-gathering applications (step 142). The service may store data sent by the respective data-gathering applications (step 143). The data is stored for later retrieval and provision to other client devices as requested.

In some cases a subject string, e.g., "let's talk about the upcoming meeting", may be entered by a caller, e.g., by voice or by another user input method, and received by the service (step 144). The service may then use the subject string as part of the data provided for display to a second device, i.e., a receiver device.

Upon initiation of the communication (step 145), the service may receive a content retrieval request from the receiver device, for identified metadata relevant to the communication (step 146). The request may be validated and a determination made as whether the receiver device is entitled to receive data from the calling device. Assuming appropriate validation occurs, metadata may be identified as relevant to the communication (step 147). To identify data as relevant, other data surrounding a nexus of facts may be determined and analyzed. For example, a phone call from a colleague may have a certain relevance, but if calendar data indicates the colleague is about to enter an important meeting, and if location data indicates the colleague is at the meeting location, such data may be employed as part of an indication displayed on a receiver device, as the timing and location indicate data about the meeting. As discussed above, the step of identifying metadata that has relevance may also include a step of analyzing data for freshness.

Data from one device may then be sent to the other device (step 148), including data such as a subject string if one was provided and/or determined. Each device may continue to receive data through its respective data gathering application, and this data may be provided to the other device if determined to be relevant to the communication. For example, if the receiver is having a dinner party and an incoming phone call is from a dinner party participant who is late for the dinner party, and GPS data indicates the late participant is driving around the neighborhood, the display may indicate the likelihood that the late participant needs directions to the dinner party. When the call is answered and the host is providing directions to the dinner party, transmitted and displayed metadata may be updated to indicate to the receiving device the current location of the caller.

Figure 6:
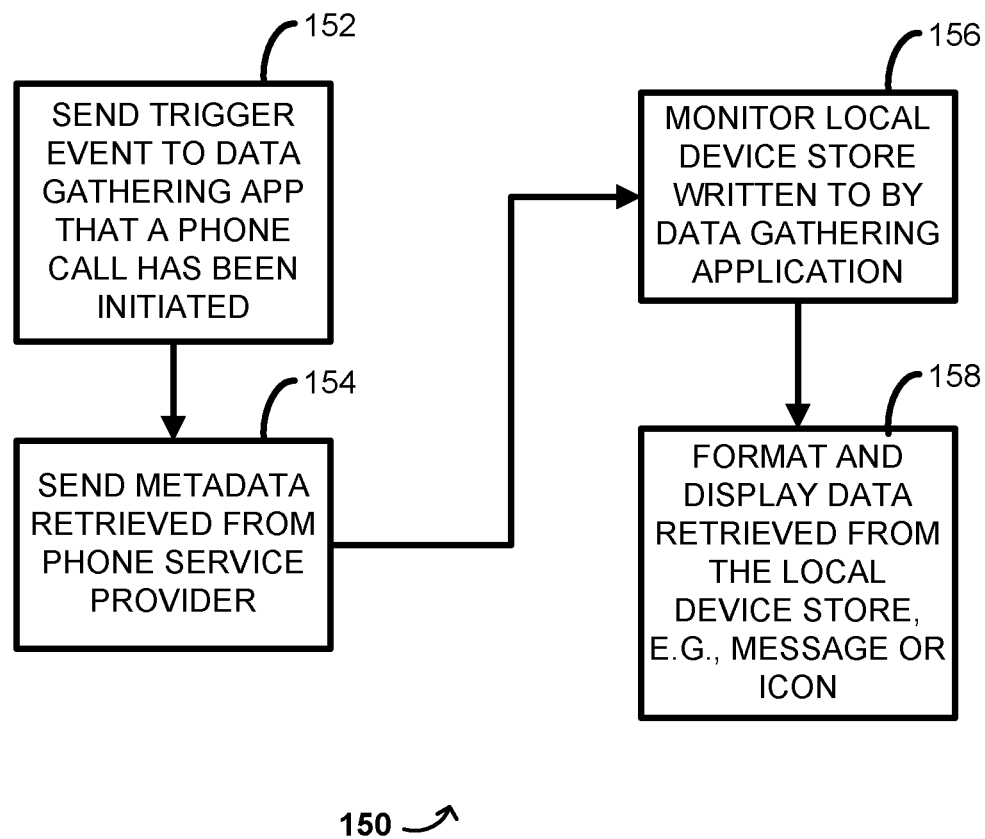
FIG. 6 is a flowchart of a method employable by a smart phone's native phone application/operating system in combination with a service in a system and method for determining and sharing locally-collected data.

FIG. 6 is a flowchart 150 which may be performed by a native phone application in concert with the described arrangement, or in some cases by the native smart phone operating system (in the case where the same controls phone activity). The native phone application constitutes the main component in triggering and displaying the results of the mutual data-gathering.

In a first step, the native phone application or operating system sends a trigger event to the data-gathering application that a phone call has been instantiated. Metadata may be retrieved from the phone service provider (step 154), such metadata including caller ID information and the like. More substantively, the native phone application may monitor a local device store written to by the data-gathering application (step 156). That is, the data-gathering application may receive relevant data through the service from the other device, and this data may be written into a local device store. This data may then be formatted and displayed once retrieved from the local device store (step 158).

Figure 7:
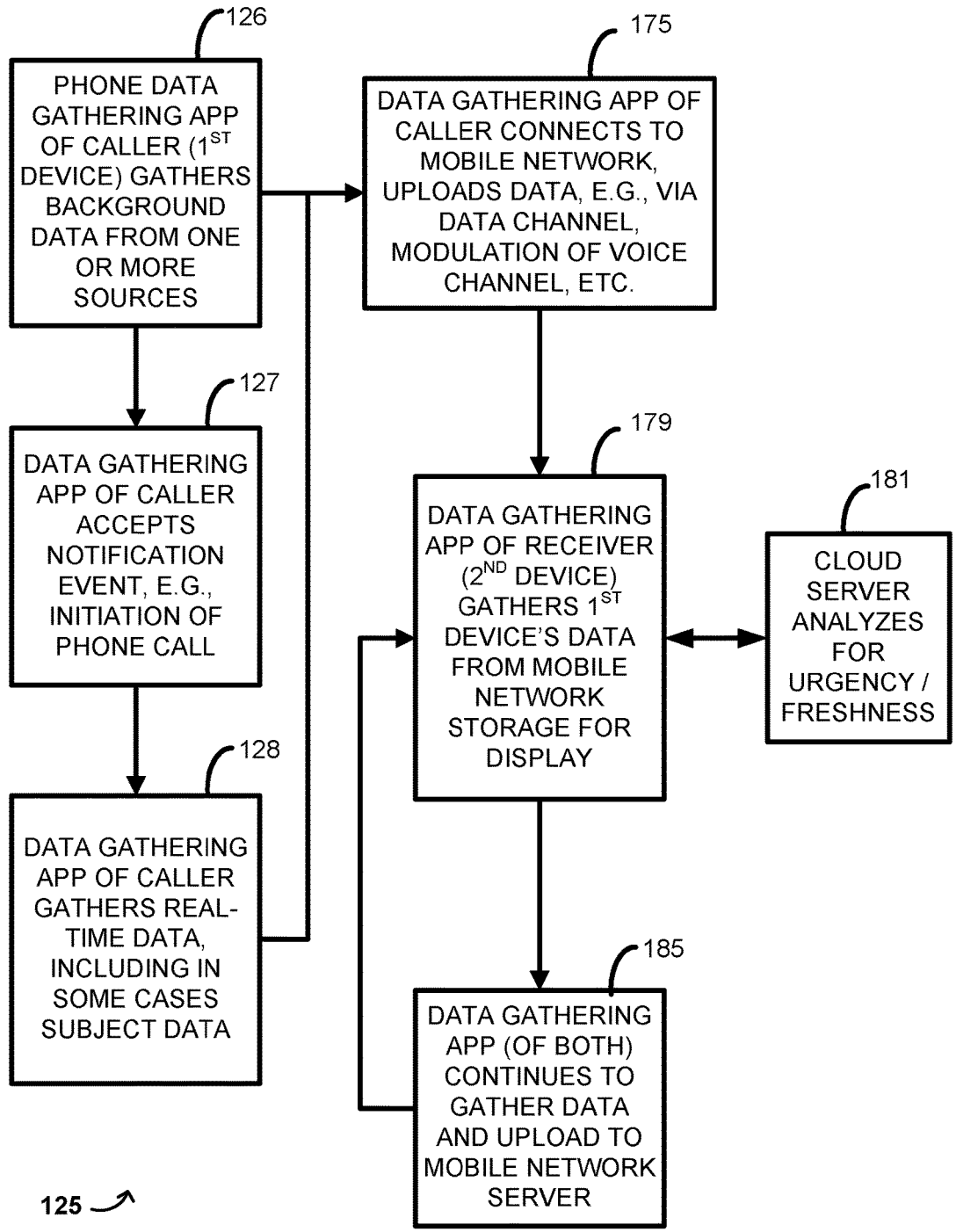
FIG. 7 is a flowchart of a method employable by a phone data-gathering application in a system and method for determining and sharing locally-collected data, where the data is shared as part of an interaction with a mobile operator network.

FIG. 7 is a flowchart 125 which is in some way similar to the flowchart 130 of FIG. 4. Certain steps are common to each, and the same are not repeated in this description. In this arrangement, however, when the data-gathering application of the caller uploads gathered data, the same occurs using a communication mechanism of a mobile operator (step 175). For example, data may be uploaded using modulation of a voice channel, using a separate data channel, using a frequency not audible to the human ear, or the like. The receiver's device likewise uses a communications mechanism of the mobile operator to gather the identified metadata about the caller's device, for storage and display at the receiver's device (and vice-versa).

An application running on a cloud server, e.g., which may be hosted by the mobile operator, may be employed to analyze the received data to make inferences and/or to determine urgency (step 181) in a similar fashion as described above with respect to step 133 of FIG. 4. And as in FIG. 4, data-gathering may continue to operate, with data sources being monitored and data transmitted to a cloud server (step 185).

Figure 8:
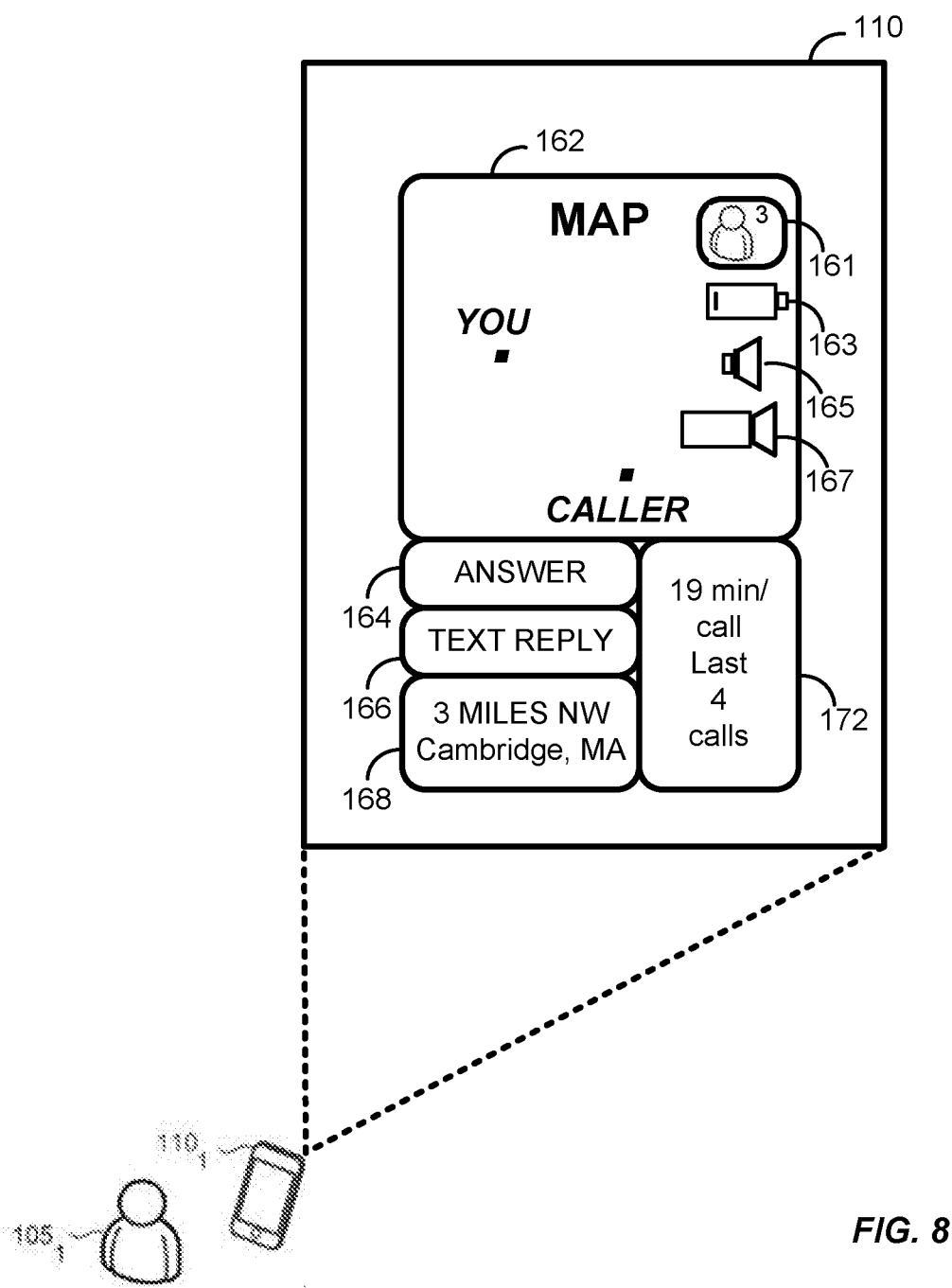
FIG. 8 illustrates one arrangement of a user interface in a system and method for determining and sharing locally-collected data.

FIG. 8 illustrates exemplary data which may be displayed on a user interface of a device 110. In this user interface, a map 162 is portrayed, with both the receiver "YOU" and the caller displayed as points on the map. Data employed to generate the map 162 are usually from GPS data, although other sources may be employed in other circumstances.

Options are provided for the receiver to respond to the call, including a button 164 to answer the call and a button 166 which may be employed text a reply. Various other metadata are displayed in combination with the displayed map, including a proximity indicator 168 indicating the distance and direction of the caller relative to the receiver, as well as the current location of the caller. A call history indicator 172 is shown, indicating an average length of call over the last four calls. It will be understood that the above indicators are merely exemplary and any number of other indicators may also be provided.

The map 162 has various icons overlaid providing additional information about the caller. An icon 161 indicates that the call is an incoming conference call, with three participants already on the call. The icon 163 indicates that the caller's phone is low on battery power. The icon 165 indicates that the caller is using a speakerphone, and the icon 167 indicates that the caller desires that the call be a video call. Other icons may also be employed according to circumstance.

Figure 9:
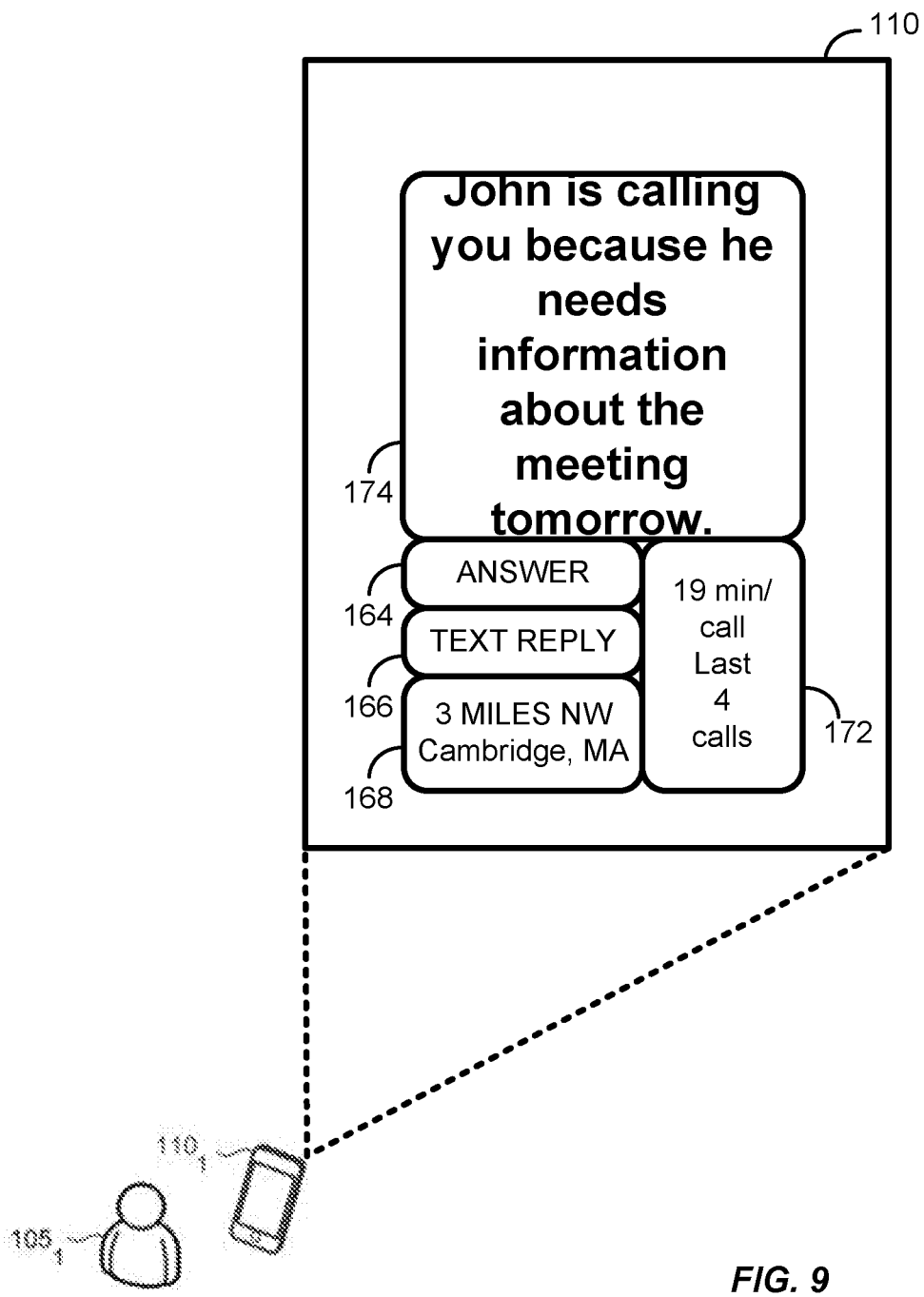
FIG. 9 illustrates another arrangement of a user interface in a system and method for determining and sharing locally-collected data.

FIG. 9 shows another user interface, and in particular a different feature on the user interface, in this case subject information entered by the caller. For example, the caller may have used a voice-driven user interface to request that the phone call be made for the purpose of asking for information about an upcoming meeting. The user interface element 174 thus indicates the subject and the results of the voice command.

Figure 10:
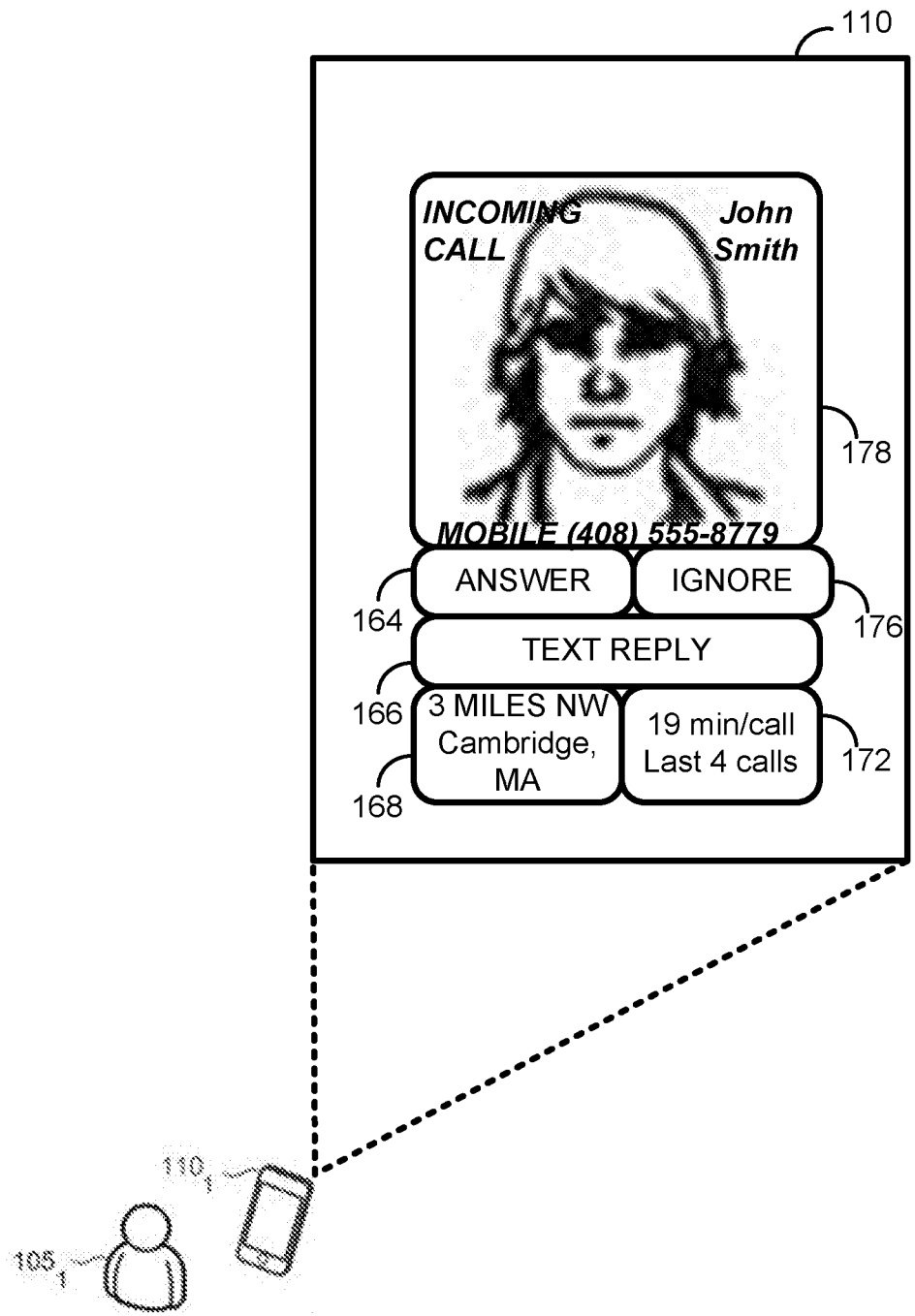
FIG. 10 illustrates yet another arrangement of a user interface in a system and method for determining and sharing locally-collected data.

FIG. 10 illustrates another user interface, and in particular a user interface element 178, in this case providing the name, phone number, and an image of the caller. In this user interface an additional option is shown, namely, an option 176 to ignore the call.

Figures 11A, 11B:
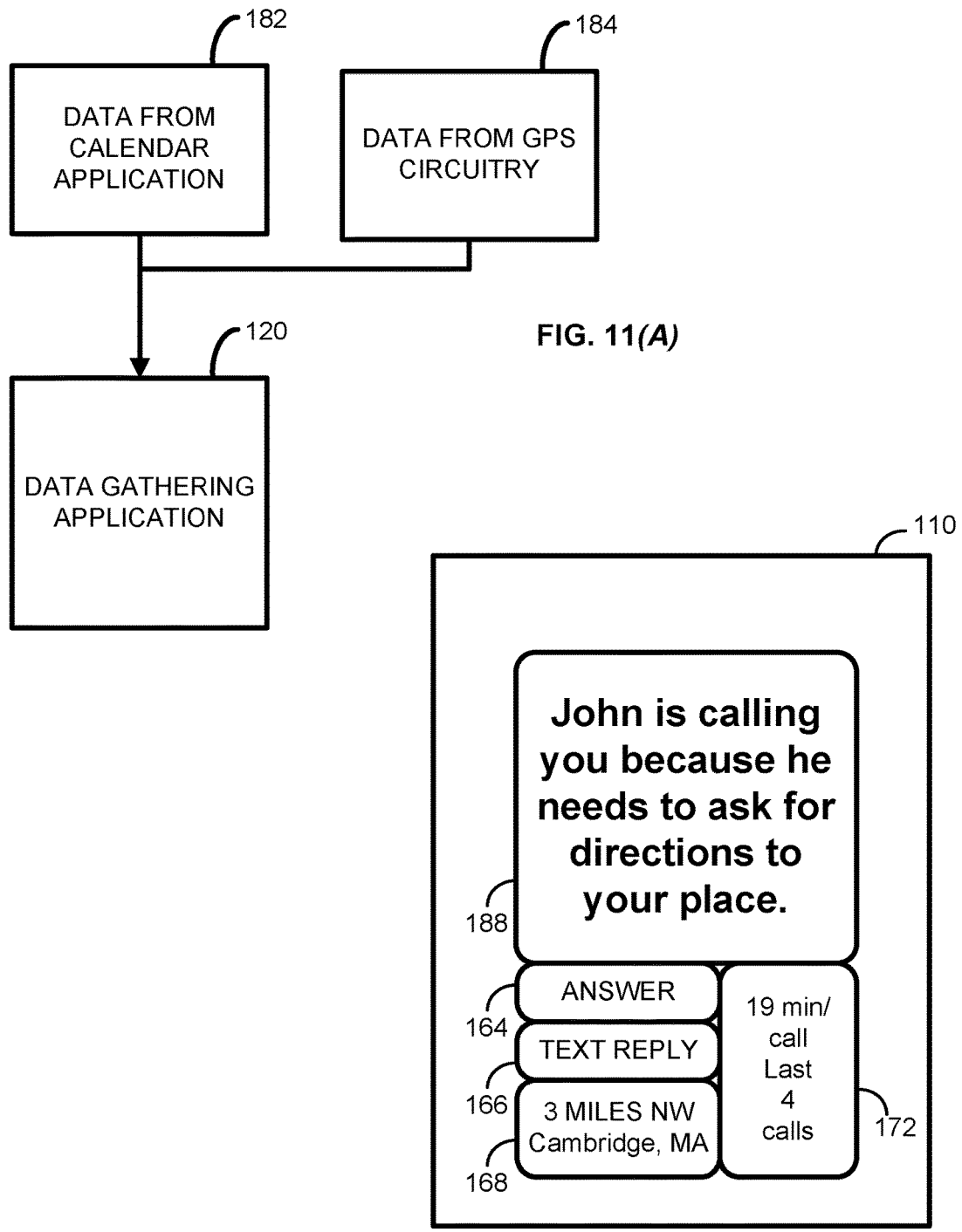
FIGS. 11(A) and 11(B) illustrate a data flow and a user interface in a further arrangement of a system and method for determining and sharing locally-collected data.

FIG. 11 depicts an example of multiple data inputs and an analysis step. In particular, FIG. 11(A) illustrates data inputs leading to the development and generation of a user interface feature 188, and FIG. 11(B) illustrates implementation of the feature 188 on the user interface of the device 110. In particular, the data-gathering application 120 may receive data from a calendar application 182 and data 184 from GPS circuitry. A step of analysis may be performed with data gathered by the application 120. In this case the analysis indicates that a dinner party is imminent, and that a participant, "John", is in the vicinity but not at the location. The analysis may cause a guess that "John" is calling because he needs to ask for directions.

FIG. 12 depicts another example. FIG. 12(A) illustrates data inputs leading to the development and generation of a user interface feature 198, and FIG. 12(B) illustrates the feature 198 on the user interface of the device 110. In particular, the data-gathering application 120 may receive data from a contacts application 192 and data about battery life 194. A step of analysis may be performed with the data gathered by the application 120. In this case the analysis indicates that the caller is the spouse of the receiver, and that her cell phone battery has low battery life. In this case, such an indication may indicate that it is particularly important for the receiver to answer the call.

Numerous other examples will also be understood, given this teaching.

Figure 13:
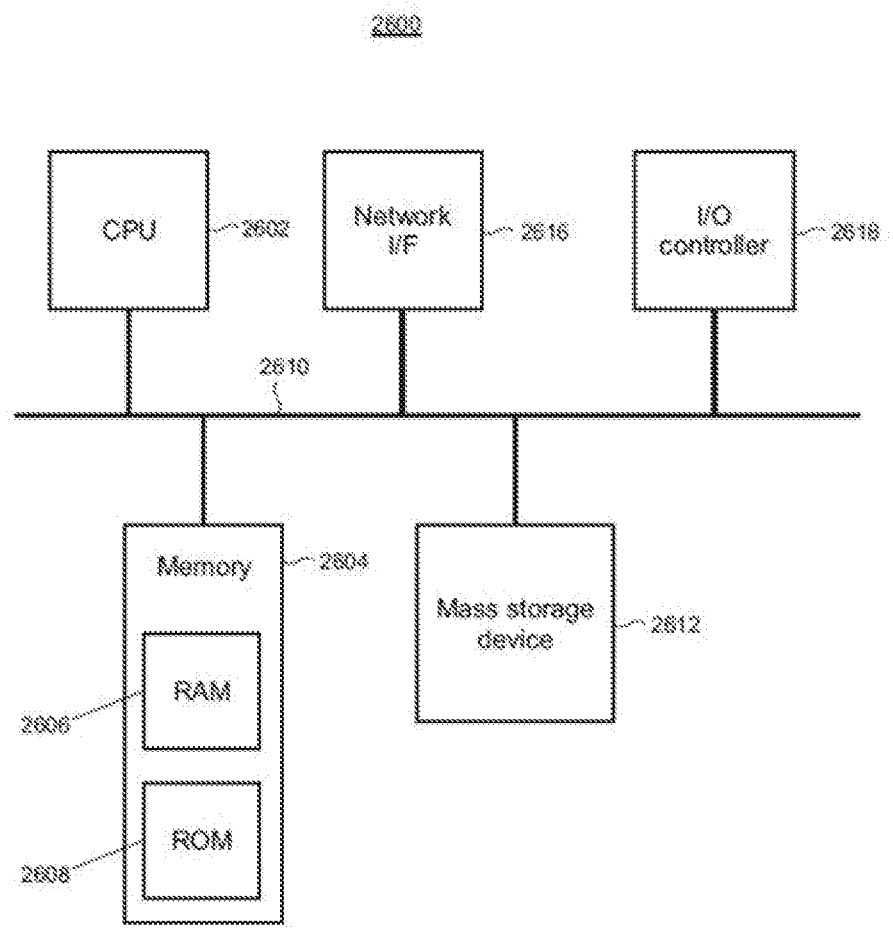
FIG. 13 shows a block diagram of an illustrative system that may be used in part to implement the present systems and methods for determining, storing, and sharing locally-collected data.

FIG. 13 shows an illustrative architecture 2600 for a device capable of executing the various components described herein for providing the present data determination, sharing, and display notifications. Thus, the architecture 2600 illustrated in FIG. 13 shows an architecture that may be adapted for a server computer, mobile phone, a PDA, a smartphone, a desktop computer, a netbook computer, a tablet computer, GPS device, gaming console, and/or a laptop computer. The architecture 2600 may be utilized to execute any aspect of the components presented herein.

The architecture 2600 illustrated in FIG. 13 includes a CPU (Central Processing Unit) 2602, a system memory 2604, including a RAM 2606 and a ROM 2608, and a system bus 2610 that couples the memory 2604 to the CPU 2602. A basic input/output system containing the basic routines that help to transfer information between elements within the architecture 2600, such as during startup, is stored in the ROM 2608. The architecture 2600 further includes a mass storage device 2612 for storing software code or other computer-executed code that is utilized to implement applications, the file system, and the operating system.

The mass storage device 2612 is connected to the CPU 2602 through a mass storage controller (not shown) connected to the bus 2610. The mass storage device 2612 and its associated computer-readable storage media provide non-volatile storage for the architecture 2600.

Although the description of computer-readable storage media contained herein refers to a mass storage device, such as a hard disk or CD-ROM drive, it may be appreciated by those skilled in the art that computer-readable storage media can be any available storage media that can be accessed by the architecture 2600.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2600.

According to various embodiments, the architecture 2600 may operate in a networked environment using logical connections to remote devices and computers through a network. The architecture 2600 may connect to the network through a network interface unit 2616 connected to the bus 2610. It may be appreciated that the network interface unit 2616 also may be utilized to connect to other types of networks and remote computer systems. The architecture 2600 also may include an input/output controller 2618 for receiving and processing input from a number of other devices, including a keyboard, mouse, or electronic stylus (not shown in FIG. 13). Similarly, the input/output controller 2618 may provide output to a display screen, a printer, or other type of output device (also not shown in FIG. 13).

It may be appreciated that the software components described herein may, when loaded into the CPU 2602 and executed, transform the CPU 2602 and the overall architecture 2600 from a general-purpose computing system into a special-purpose computing system customized to facilitate the functionality presented herein. The CPU 2602 may be constructed from any number of transistors or other discrete circuit elements, which may individually or collectively assume any number of states. More specifically, the CPU 2602 may operate as a finite-state machine, in response to executable instructions contained within the software modules disclosed herein. These computer-executable instructions may transform the CPU 2602 by specifying how the CPU 2602 transitions between states, thereby transforming the transistors or other discrete hardware elements constituting the CPU 2602.

Encoding the software modules presented herein also may transform the physical structure of the computer-readable storage media presented herein. The specific transformation of physical structure may depend on various factors, in different arrangements of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such arrangements, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2600 in order to store and execute the software components presented herein. It may also be appreciated that the architecture 2600 may include other types of computing devices, including handheld computers, embedded computer systems, smartphones, PDAs, and other types of computing devices known to those skilled in the art. It is also contemplated that the architecture 2600 may not include all of the components shown in FIG. 13, may include other components that are not explicitly shown in FIG. 13, or may utilize an architecture completely different from that shown in FIG. 13.

Figure 14:
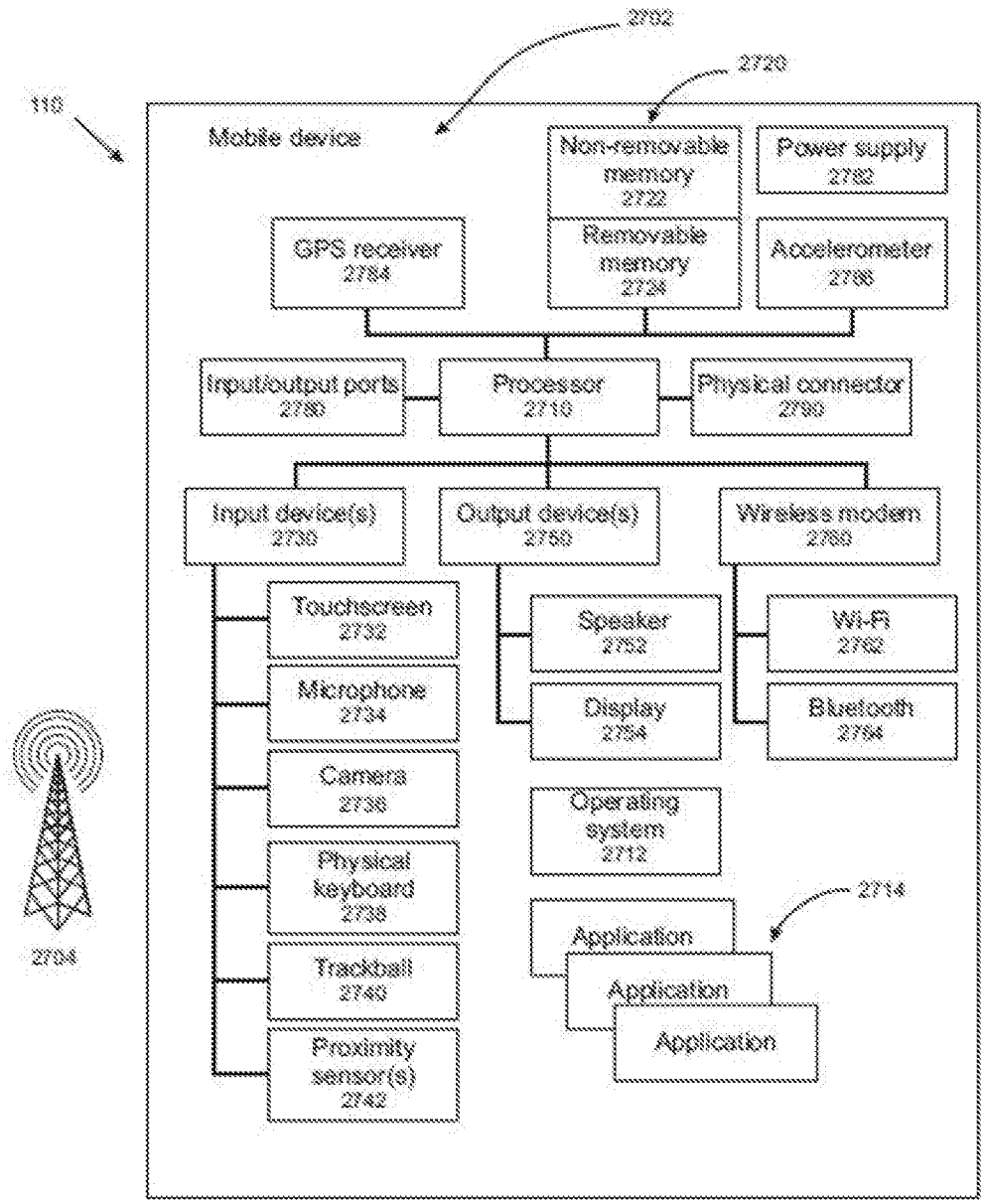
FIG. 14 is a block diagram of an illustrative mobile device.

FIG. 14 is a functional block diagram of an illustrative mobile device 110 such as a mobile phone or smartphone including a variety of optional hardware and software components, shown generally at 2702. Any component 2702 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2704, such as a cellular or satellite network.

The illustrated device 110 can include a controller or processor 2710 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2712 can control the allocation and usage of the components 2702, including power states, above-lock states, and below-lock states, and provides support for one or more application programs 2714. The application programs can include common mobile computing applications (e.g., image-capture applications, email applications, calendars, contact managers, web browsers, messaging applications), or any other computing application.

The illustrated mobile device 110 can include memory 2720. Memory 2720 can include non-removable memory 2722 and/or removable memory 2724. The non-removable memory 2722 can include RAM, ROM, Flash memory, a hard disk, or other well-known memory storage technologies. The removable memory 2724 can include Flash memory or a Subscriber Identity Module (SIM) card, which is well known in GSM (Global System for Mobile communications) systems, or other well-known memory storage technologies, such as "smart cards." The memory 2720 can be used for storing data and/or code for running the operating system 2712 and the application programs 2714. Example data can include web pages, text, images, sound files, video data, or other data sets to be sent to and/or received from one or more network servers or other devices via one or more wired or wireless networks.

The memory 2720 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device 110.

The memory 2720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 2730, including a touch screen 2732; a microphone 2734 for implementation of voice input for voice recognition, voice commands and the like; a camera 2736; a physical keyboard 2738; a trackball 2740; and/or a proximity sensor 2742; and one or more output devices 2750, such as a speaker 2752 and one or more displays 2754. Other input devices (not shown) using gesture recognition may also be utilized in some cases. Other possible output devices (not shown) can include piezoelectric or haptic output devices. Some devices can serve more than one input/output function. For example, touchscreen 2732 and display 2754 can be combined into a single input/output device.

A wireless modem 2760 can be coupled to an antenna (not shown) and can support two-way communications between the processor 2710 and external devices, as is well understood in the art. The modem 2760 is shown generically and can include a cellular modem for communicating with the mobile communication network 2704 and/or other radio-based modems (e.g., Bluetooth 2764 or Wi-Fi 2762). The wireless modem 2760 is typically configured for communication with one or more cellular networks, such as a GSM network for data and voice communications within a single cellular network, between cellular networks, or between the mobile device and a public switched telephone network (PSTN).

The mobile device can further include at least one input/output port 2780, a power supply 2782, a satellite navigation system receiver 2784, such as a GPS receiver, an accelerometer 2786, a gyroscope (not shown), and/or a physical connector 2790, which can be a USB port, IEEE 1394 (FireWire) port, and/or an RS-232 port. The illustrated components 2702 are not required or all-inclusive, as any components can be deleted and other components can be added.

In some cases, the components described can serve as a source of locally-collected data, and such is particularly true of the port 2780, the receiver 2074, the accelerometer 2786, and physical connector 2790, as well as transceivers for Bluetooth communications and network communications, as the same may be conveniently employed to determine user metadata which can then be gathered by the data-gathering application and uploaded to a cloud service for subsequent transmission to one or more other devices, e.g., for display.

Variations of the above will be understood. For example, the arrangements described may not only be employed in communications such as voice calls, but also in conference calls with more than two users, e.g. three-way calls, conference calls, and the like with multiple users. The arrangements described may be implemented using peer-to-peer networking, but in many cases will be implemented using a client/server architecture.

The invention claimed is:

1. A method performed by a service that is operable on devices engaged in a network communication, comprising:
    a. configuring a network accessible service to interoperate with respective local clients on each of two or more devices, including a first and second device, each respective local client gathering data associated with the respective device;
    b. during initiation of a voice call between the first and second devices:
        i. identifying metadata that has relevance to the voice call, the metadata being derived from the gathered data;
        ii. filtering the identified metadata to eliminate metadata that does not meet a predetermined freshness criteria, wherein a predetermined threshold of freshness is set for each type of metadata and varies for different types of metadata; and
        iii. transmitting the metadata meeting the predetermined threshold of freshness for the corresponding type of metadata to the second device using the service for display on the second device, wherein data transmissions are reduced for less-frequently-varying data.

2. The method of claim 1, further comprising downloading each local client to the respective device.

3. The method of claim 1, further comprising continuing to gather data associated with each respective device and performing the transmitting the metadata step during the voice call.

4. The method of claim 1, wherein the identifying metadata that has relevance to the voice call includes identifying metadata pertaining to a low battery life of the first device, data pertaining to an upcoming appointment stored as calendar data within the first device, data about a proximity of the first device to the second device, data about whether the first device is using an internal speaker, a speakerphone, or a wireless headset, contact data associated with a user of the first device, or combinations thereof.

5. The method of claim 1, wherein the service is configured to receive data from a wearable device in voice call with the first device.

6. The method of claim 1, wherein the service is implemented by a service component on a cloud server that exposes a REST API to respective client service components operating on the devices.

7. The method of claim 1, further comprising transmitting a file between the first and second devices using the service.

8. The method of claim 7, wherein the file is a meeting invitation.

9. The method of claim 1, further comprising transmitting a subject string to the second device from the first device using the service, wherein the subject is entered on a user interface of the first device, and wherein the service causes display of the subject on a user interface of the second device.

10. The method of claim 1, further comprising transmitting default data having relevance to the voice call, the default data set by a user for at least one data type for the first device for which no analysis is available for metadata identified in said identifying step.

11. A method performed by a first device used in communication with a second device, comprising:
    a. operating a data gathering client on the first device, the operating including collecting data from one or more data sources associated with the first device, and identifying a portion of the same as relevant to a communication, the identifying based on comparing the collected data to one or more criteria;
    b. transmitting the identified data as first metadata to a service; and
    c. during initiation of a communication from the first device to a second device, identifying a portion of real-time data as relevant to a communication using the data gathering client, the identifying based on comparing the real-time data to one or more criteria, filtering the identified relevant real-time data to eliminate data that does not meet a predetermined freshness criteria, wherein a predetermined threshold of freshness is set for each type of metadata and varies for different types of metadata, and transmitting the filtered identified real-time data meeting the predetermined threshold of freshness as second metadata to the service, wherein data transmissions are reduced for less-frequently-varying data,
    such that during the initiation of the communication, at least a portion of the first or second metadata, or both, are transmitted to the second device from the service for display on a user interface of the second device.

12. The method of claim 11, wherein the one or more data sources include one or more selected from the group consisting of: an accelerometer, GPS circuitry, a database for a calendar application, settings data, battery data, local Wi-Fi or other geolocation data, phone application data, exercise application data, data input by a user on a user interface, data from a wearable device in communication with the first device, and combinations thereof.

13. The method of claim 12, wherein the one or more data sources include data input by a user on a user interface, wherein the data input by a user constitutes subject data, wherein the subject data is entered using a voice-driven user interface, and wherein at least a portion of the subject data is provided to the second device from the service for display on the user interface of the second device.

14. The method of claim 11, wherein the real-time data is received from a source selected from the group consisting of: GPS circuitry, a database for a calendar application, battery data, and combinations thereof.

15. The method of claim 11, wherein the service is configured to perform an additional step of determining which of the first or second metadata, or both, are identified as relevant to the communication and provided to the second device for display.

16. The method of claim 15, wherein the service performs an urgency determination, and wherein the urgency determination is based on metadata pertaining to an upcoming appointment stored as calendar data within the first device, data about a proximity of the first device to the second device, location data associated with the first device, contact data associated with a user of the first device, or combinations thereof.

17. A local device having telephony capabilities for making and receiving calls to and from a remote device, comprising:
    a. one or more processors;
    b. a user interface for displaying call information including selected metadata;
    c. a network interface for sending and receiving information pertaining to a call; and
    d. a memory device storing computer-executable instructions which, when executed by the one or more processors, implements:
        i. a data gathering client configured for harvesting data from one or more data sources available to the local device, the harvesting being performed in real time during initiation or pendency of the call responsively to one or more relevancy criteria, and filtering the data to eliminate data that does not meet a predetermined freshness criteria, wherein a predetermined threshold of freshness is set for each type of data and varies for different types of data,
        ii. a service interface for communicating the filtered harvested data to a remote service over the network interface and for receiving data from the remote service, the communicating being performed according to variability of the harvested data, and
        iii. a data rendering client for determining which data received from the remote service is rendered as selected metadata on the user interface.

18. The device of claim 17, wherein the one or more data sources include one or more selected from the group consisting of: an accelerometer, GPS circuitry, a database for a calendar application, settings data, battery data, local Wi-Fi or other geolocation data, phone application data, exercise application data, data input by a user on a user interface, data from a wearable device in communication with the local device, and combinations thereof.

19. The device of claim 18, wherein the remote service is configured to analyze data from at least two data sources, and to transmit an icon or message for display on a user interface of the remote device based on the analysis.

20. The device of claim 17, wherein the service interface is further configured for transmitting default data having relevance to the call to the remote device, the default data set by a user for at least one data type for the local device for which no analysis is available for data harvested by the data gathering client.

* * * * *